INVENTOR.
GEORGE P. AHEARN
ATTORNEY

United States Patent Office 3,663,477
Patented May 16, 1972

3,663,477
DILATANT AQUEOUS POLYMER SOLUTIONS
George P. Ahearn, Houston, Tex., assignor to
Esso Production Research Company
Continuation-in-part of application Ser. No. 595,733,
Nov. 21, 1966. This application Feb. 27, 1970, Ser.
No. 14,905
Int. Cl. B65g 53/04; E21b 43/16; B01j 13/00
U.S. Cl. 252—311.5
10 Claims

ABSTRACT OF THE DISCLOSURE

A composition of matter including as essential ingredients at least 0.001 weight percent of a high molecular weight polymer of ethylene oxide, between about 0.5 weight percent and about 10 weight percent of a petroleum sulfonate having an average molecular weight of at least 400, and a major proportion of water. The composition exhibits non-Newtonian dilatant rheological characteristics. The composition has utility as a liquid vehicle for the transportation of particulate solids, as a fluid for fracturing subterranean oil-bearing formations, and as a fluid for displacing oil from subterranean formations.

CROSS REFERENCE TO RELATED APPLICATIONS

This application is a continuation-in-part of U.S. patent application Ser. No. 595,733 "Dilatant Aqueous Polymer Solutions," George P. Ahearn, filed Nov. 21, 1966, now abandoned.

BACKGROUND OF THE INVENTION (1) Field of the invention

This invention relates to a composition of matter and methods of using such a composition. The composition is a mixture of high molecular weight polymers of ethylene oxide, petroleum sulfonate, and water. The composition has utility in methods for transporting particulate solids, fracturing subterranean formations, and recovering oil from oil-bearing formations.

(2) Description of the prior art

Dilatant fluids have been known for some time but until now little use has been made of the special and unique combination of properties of these fluids. Most of the dilatant fluid systems are combinations of liquid and relatively large-sized solid particles. The solid particles may range in size from one to many microns and may represent approximately half of the total solid-liquid fluid system by volume. At these high solids concentrations, depending upon the size and shape of the solid particles, such a system flows easily under the action of small stresses but resists attempts to make it flow more rapidly. It has been theorized that the solid particles under the action of small applied forces slip around each other being lubricated by a layer of the liquid between the particles. As the force is increased, however, it seems to cause the solid particles to pack together and prevent the slipping of the particles which occurs at lesser forces. This relative resistance to flow at high force levels is termed dilatancy.

The solids employed in such dilatant fluid systems are not of molecular size. Typical solids are finely ground quartz powder, ground corn, rice, potato, and starches. The individual particles are crystalline or are large aggregates containing up to many millions of molecules. Liquid systems of these materials are difficult to handle and transport. Generally, they are a semi-paste having a high viscosity at even very low shear rates. Some such systems are highly abrasive to pumps and conduits. Most are expensive due to the high concentration of solids necessary to achieve dilatancy.

SUMMARY OF THE INVENTION

This invention relates to a composition of matter having strongly dilatant rheological characteristics. The essential ingredients of the composition are minor amounts of a high molecular weight polymer of ethylene oxide, a petroleum sulfonate, and a major proportion of water. Minor amounts of other substances may be included which do not affect the essential rheological characteristics of the composition. The composition has utility in the pipeline transmission of dispersed solids, in the fracturing of subsurface formations, and in the recovery of oil from subsurface reservoirs.

It is an object of this invention to provide a composition which has highly dilatant rheological characteristics. It is a further object of this invention to provide an economical fluid system for the pipeline transmission of dispersed solids. It is a further object of this invention to provide an economical fluid system for the fracturing of subsurface oil formations. It is another object of this invention to provide an economical fluid system for the recovery of oil from subsurface reservoirs.

Objects and features of the invention not apparent in the above discussion will become evident on the consideration of the following drawings and description of the invention.

DESCRIPTION OF THE PREFERRED EMBODIMENT

This invention relates to mixtures of petroleum sulfonates, high molecular weight polymers of ethylene oxide and water. It has been found that such mixtures exhibit highly dilatant rheological characteristics. These mixtures are suitable for use in the pipeline transmission of dispersed solids such as coal or sulfur, in the fracturing of subsurface formations and in the recovery of oil from subsurface reservoirs.

Fluids are generally characterized as being Newtonian or non-Newtonian. Newtonian fluids such as water or alcohols exhibit a shear stress which is proportional to the shear rate. When the shear rate is plotted as a function of shear stress for a Newtonian fluid, the result is a straight line. The slope of the line is the viscosity of the Newtonian fluid.

Non-Newtonian fluids do not have a linear flow curve, i.e., the "viscosity" of a non-Newtonian fluid is not constant at a given temperature and pressure but depends on other factors such as the rate of shear in the fluid, the apparatus in which the fluid is contained or even the previous history of the fluid. Various characteristics of non-Newtonian fluids have been described. Among these characteristics are pseudoplasticity and dilatancy. The shear rate-shear stress curves for both pseudoplastic fluids and dilatant fluids are non-linear. Since the viscosity of these fluids varies with shear rate, it is termed an apparent viscosity. Pseudoplastic fluids are shear thinning. The apparent viscosity decreases progressively as shear rate increases. Dilatant fluids show the opposite characteristic. Such fluids are termed shear thickening since their apparent viscosity increases with an increase in shear rate.

One surprising aspect of this invention is the discovery that these two aqueous solutions which individually exhibit pseudoplastic characteristics form a highly dilatant fluid when mixed. This dilatant characteristic can be clearly seen in FIG. 1.

Figure 1:
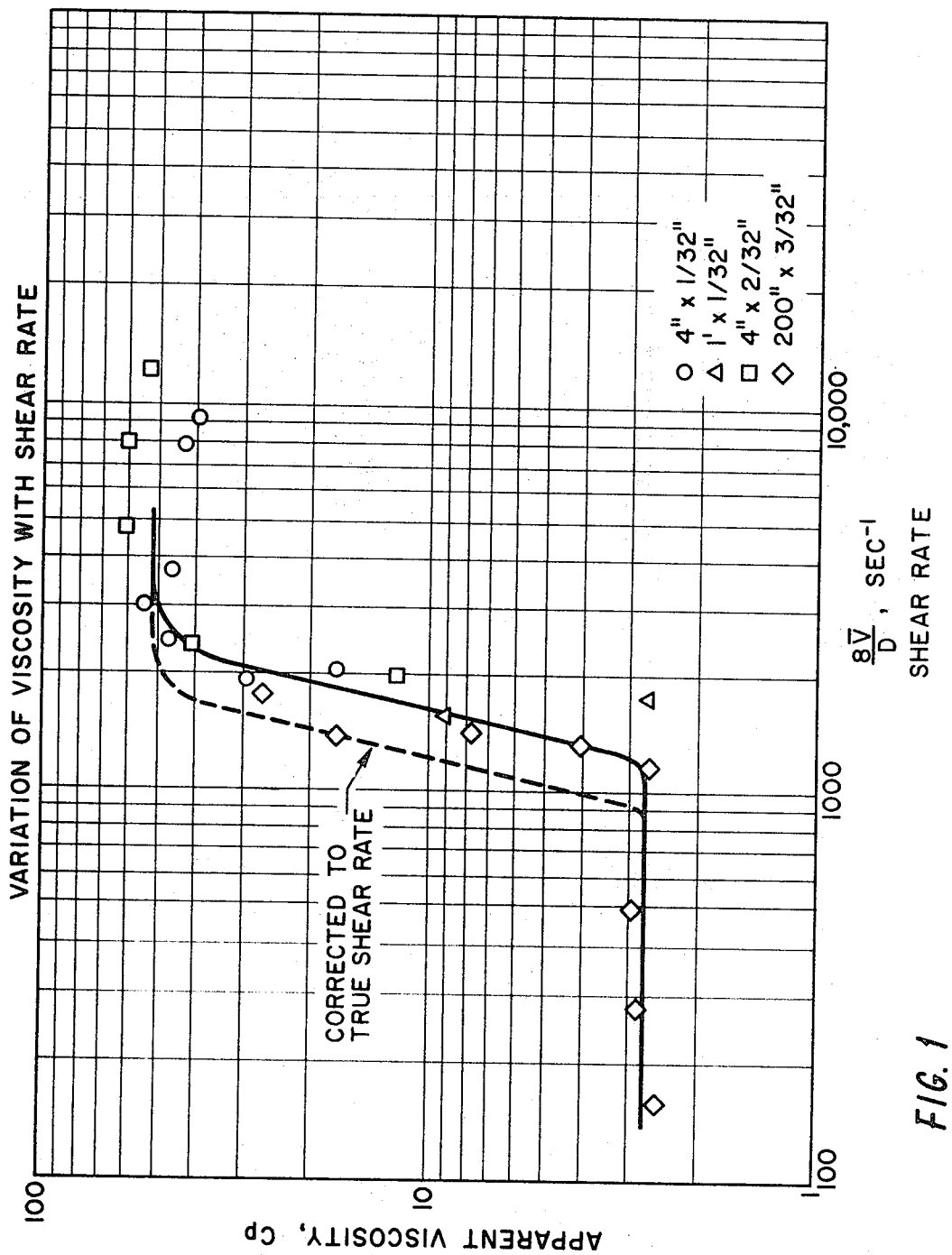
FIG. 1 is a log-log graph showing the variation of apparent viscosity with shear rate for a composition of this invention and illustrates the dilatant rheological characteristics of such compositions.

In FIG. 1, the variation of viscosity with shear rate is plotted for a composition consisting of water, 0.125 percent by weight of an ethylene oxide polymer having a molecular weight of approximately 4,000,000, and 1.0 percent by weight of natural petroleum sulfonate having an average molecular weight of approximately 400. This sulfonate was obtained by sulfonating a blend of vacuum gas-oil cuts (boiling within the 800° to 1000° F. range) obtained from Texas Gulf Coast petroleum crudes. The data were obtained with a capillary viscometer, using capillary tubes of four different dimensions, as listed on the drawing. The viscometer used in obtaining this data was of the type described in Combs, "A Field Capillary Viscometer for Drilling Muds," 67–PET–10, published by American Society of Mechanical Engineers. The quantity $\Delta PD/4L$ is the true wall shear stress in the capillary, while the quantity $8\overline{V}/D$ is the wall shear rate only for a Newtonian fluid. The dotted curve in the drawing is the result obtained when $8\overline{V}/D$ is corrected to a true wall shear rate by conventional procedures.

As indicated in FIG. 1, the composition is highly dilatant for shear rates between about 1000 and 2000 reciprocal seconds. At lower shear rates, the fluid is essentially Newtonian with a viscosity of about 2.7 centipoises. At higher shear rates, the fluid appears to be slightly pseudoplastic with a viscosity of about 52 centipoises. In the higher shear rate range, the stream of fluid jetting from the capillary was somewhat larger than the internal diameter of the capillary tube, which is indicative of a highly viscoelastic fluid.

The dilatant character of the compositions of the present invention may be attributable to some interaction between the polymer molecules and the sulfonate molecules. A molecular association complex, for example, may be formed at a given threshold shear rate. Solutions of the polymer alone, and solutions of the sulfonate alone, exhibit no dilatant character and are actually shear thinning.

Solutions of the polymer alone do exhibit a certain degree of viscoelasticity. The compositions of the present invention, however, exhibit a greatly enhanced degree of viscoelasticity compared to that of the polymer solutions alone.

The ethylene oxide polymers are colorless, thermoplastic synthetic resins, soluble both in water and in halogenated organic solvents. They have a highly ordered crystalline structure. They are obtained by subjecting the monomeric ethylene oxide, usually in admixture with a diluent such as butane, to an elevated temperature in the presence of an active polymerization catalyst. Suitable catalysts include the alkaline-earth metal carbonates and alkaline-earth derivatives of organic mono- and polyhydroxy compounds, such as strontium methylate and calcium glycolate. The polymers may range in average molecular weight from as low as 50,000 up to at least 5,000,000.

Polymers of ethylene oxide which are suitable for the practice of this invention are readily and commercially available. One group of these polymers is sold by Union Carbide Corporation under the trademark Polyox. The Polyox resins are classified in two main types depending on the degree of pituitousness exhibited by the polymer. Pituitousness is the tendency of aqueous solutions of the polymer to form long strings or filaments as any immersed object is withdrawn from them. Both of these main types have been tested and found satisfactory in the practice of this invention. The two main types of Polyox resins are manufactured in a variety of molecular weights. Only the high molecular weight polymers are useful in the practice of this invention. Polymers having an average approximate molecular weight of 600,000 or greater will exhibit dilatant fluid characteristics when mixed with aqueous solutions of petroleum sulfonates in accordance with the teachings of this application. Polymers having a lower molecular weight do not exhibit this characteristic and are not suitable for use in this invention. For convenience and clarity, the materials which are suitable for the practice of this invention will be referred to as high molecular weight polymers of ethylene oxide.

A minimum concentration of ethylene oxide polymer of about 0.001 weight percent must be used in the practice of this invention. When the polymer concentration is reduced below this level, the aqueous solution of polymer and petroleum sulfonate will not exhibit dilatant rheological characteristics. The upper concentration of polymer depends primarily on the range of viscosities desired for a particular use. However, it should be noted that the presence of the petroleum sulfonate will reduce the solubility of the polymer in the solution. Quite naturally, the concentration of the polymer should not be so great that it undergoes precipitation in the presence of the petroleum sulfonate. For most of the purposes of this invention, a polymer concentration between about 0.02 and about 1.5 percent by weight is adequate.

Figure 2:
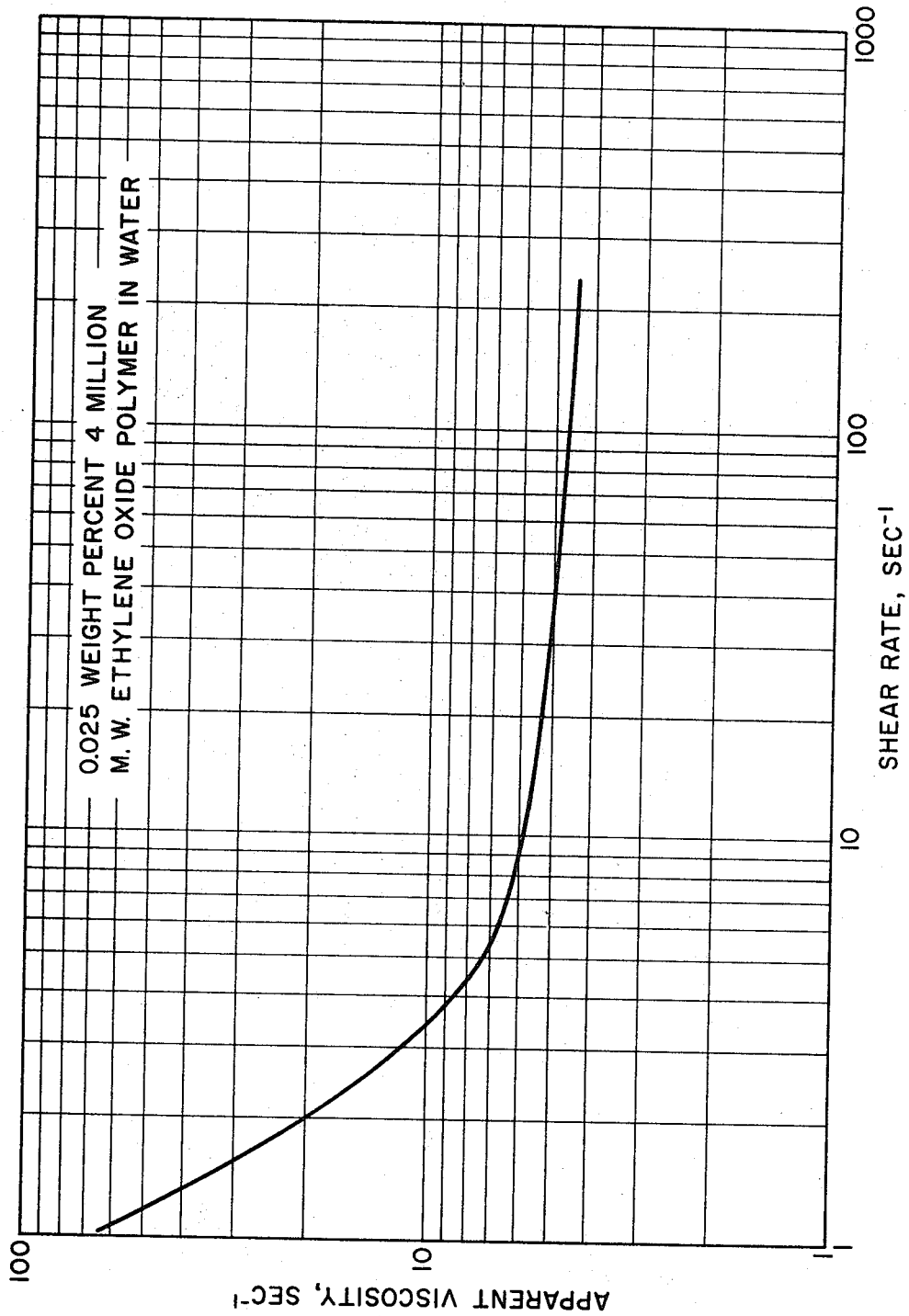
FIG. 2 is a log-log graph showing the variation of apparent viscosity with shear rate of an aqueous solution of a polymer of ethylene oxide and illustrates the pseudoplastic rheological characteristics of such a solution.

As was previously stated, high molecular weight polymers of ethylene oxide in aqueous solutions exhibit pseudoplastic characteristics. The rheological behavior of such a fluid can perhaps be most easily seen with reference to FIG. 2. This figure shows the variation of apparent viscosity with shear rate for an aqueous solution of high molecular weight ethylene oxide polymer. The polymer was dissolved in distilled water at a concentration of 0.025 percent by weight. The particular polymer used was Polyox WSR–301 having an approximate average molecular weight of 4,000,000. A portion of the aqueous solution was placed in a Wells-Brookfield Model LTV Micro Viscometer, and the apparent viscosity was determined as a function of shear rate. As can be seen on FIG. 2, aqueous solutions of a high molecular weight polymers of ethylene oxide have an apparent viscosity which decreases with increasing shear rates. Such rheological behavior is indicative of a pseudoplastic fluid.

The surfactant component of this invention is a sulfonated hydrocarbon, and more specifically, a petroleum sulfonate having a molecular weight of at least 400. The petroleum sulfonates may be natural petroleum sulfonates prepared from a crude oil or refinery stream or synthetic petroleum sulfonates prepared from alkyl aryl fractions synthesized in various chemical reactions.

The preferred sulfonates for the use in the practice of this invention are prepared by sulfonating at least a portion of the sulfonatable constituents which occur in the 600–1100° F. boiling range of a petroleum crude oil fraction. Such fractions are generally known in the art of petroleum refining as lube oil distillates and may be identified by the ASTM Standard Method of Distillation D 1160–61.

It should be noted that it is common practice to identify a petroleum fraction as having a 600°–1100° F. boiling range even though such a fraction may have an initial boiling point below 600° F. or may not be completely distilled by the ASTM Standard Method before a maximum vapor temperature is reached. If, however, the first 10 volume percent has a distillation temperature of 600° F. or greater, and at least 90 percent of the fraction is distilled below 1100° F., such a fraction is generally said to be a 600°–1100° F. boiling range and is considered to be so for the purposes of this application.

It has been found that petroleum sulfonates having a molecular weight less than 400 are not satisfactory for use in the practice of this invention. In general, the most effective sulfonates have a molecular weight in the range of about 400 to about 525. The molecular weights referred to herein in connection with petroleum sulfonates are those of the sodium salts. Moreover, the term molecular weight should be understood to mean equivalent or combining weight which is defined as the molecular weight per sulfonate group. The term molecular weight is used herein for convenience and clarity because it is commonly applied by manufacturers of petroleum sulfonates in describing their products.

The sulfonates used in the practice of this invention must be soluble or at least dispersible in the solutions of this invention at the concentration ranges employed. Useful concentrations of the sulfonates lie in the range of about 0.5 weight percent up to about 10 weight percent.

Figure 3:
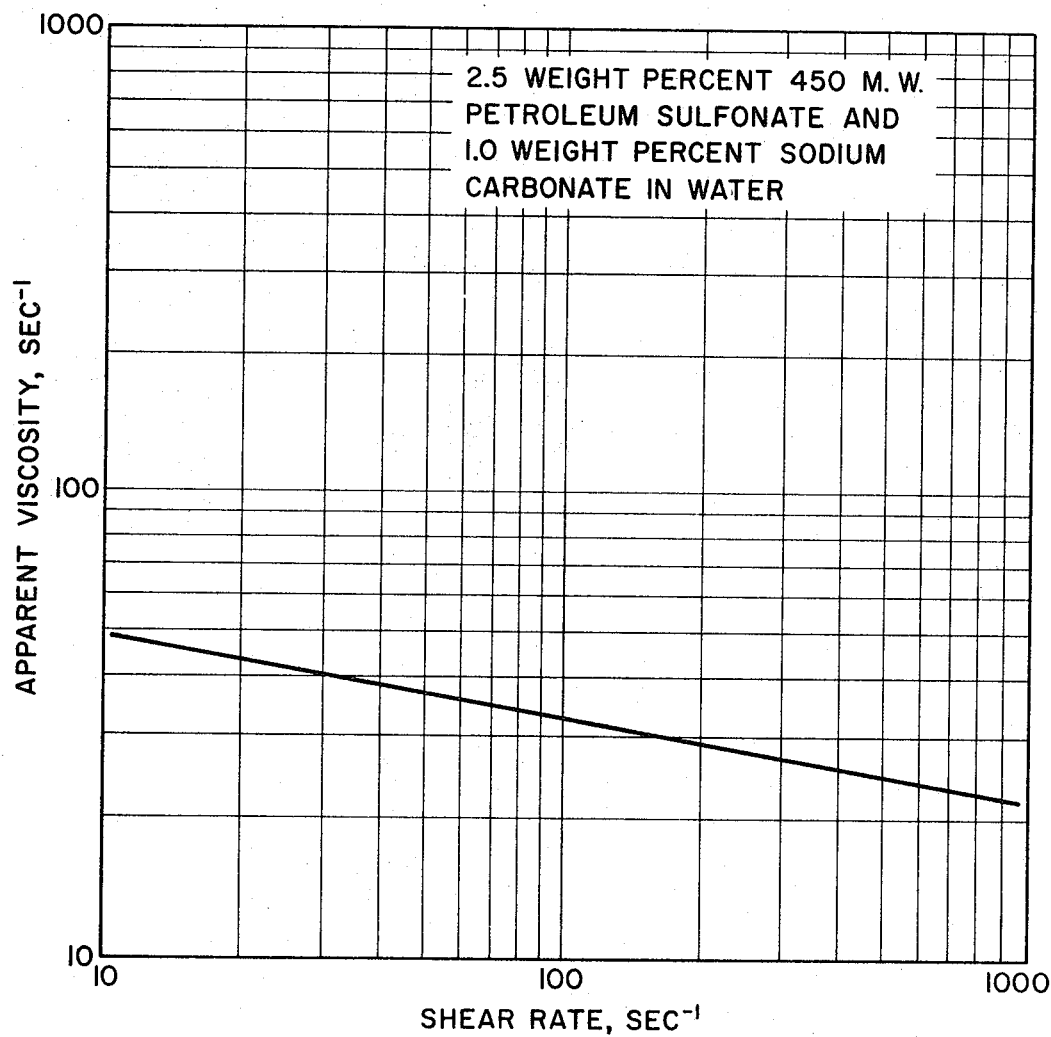
FIG. 3 is a log-log graph showing the variation of apparent viscosity with shear rate for an aqueous solution of a petroleum sulfonate and illustrates the pseudoplastic rheological characteristics of such a solution.

As was previously noted, aqueous solutions of the petroleum sulfonates exhibit pseudoplastic rheological characteristics. This can be seen clearly in FIG. 3. FIG. 3 shows the variation in apparent viscosity with changing shear rate of a natural petroleum sulfonate having an average molecular weight of approximately 450 at a concentration of 2.5 weight percent in water containing 1.0 weight percent sodium carbonate. This petroleum sulfonate was produced from the sulfonation with gaseous SO₃ of a phenol extract of a distillate from a North Louisiana paraffinic crude oil. The boiling range of the phenol extract as determined by the ASTM Standard Method corrected to 760 millimeters of mercury was— first 10 percent, 871° F.; 90 percent, 978° F.

A portion of the sulfonate solution was placed in a Fann Model 39 Rotational Viscometer and the apparent viscosity determined at various shear rates. As is shown in FIG. 3, aqueous solutions of these sulfonates exhibit strong pseudoplastic characteristics. As the shear rate increases, the apparent viscosity of the solution decreases.

Figure 4:
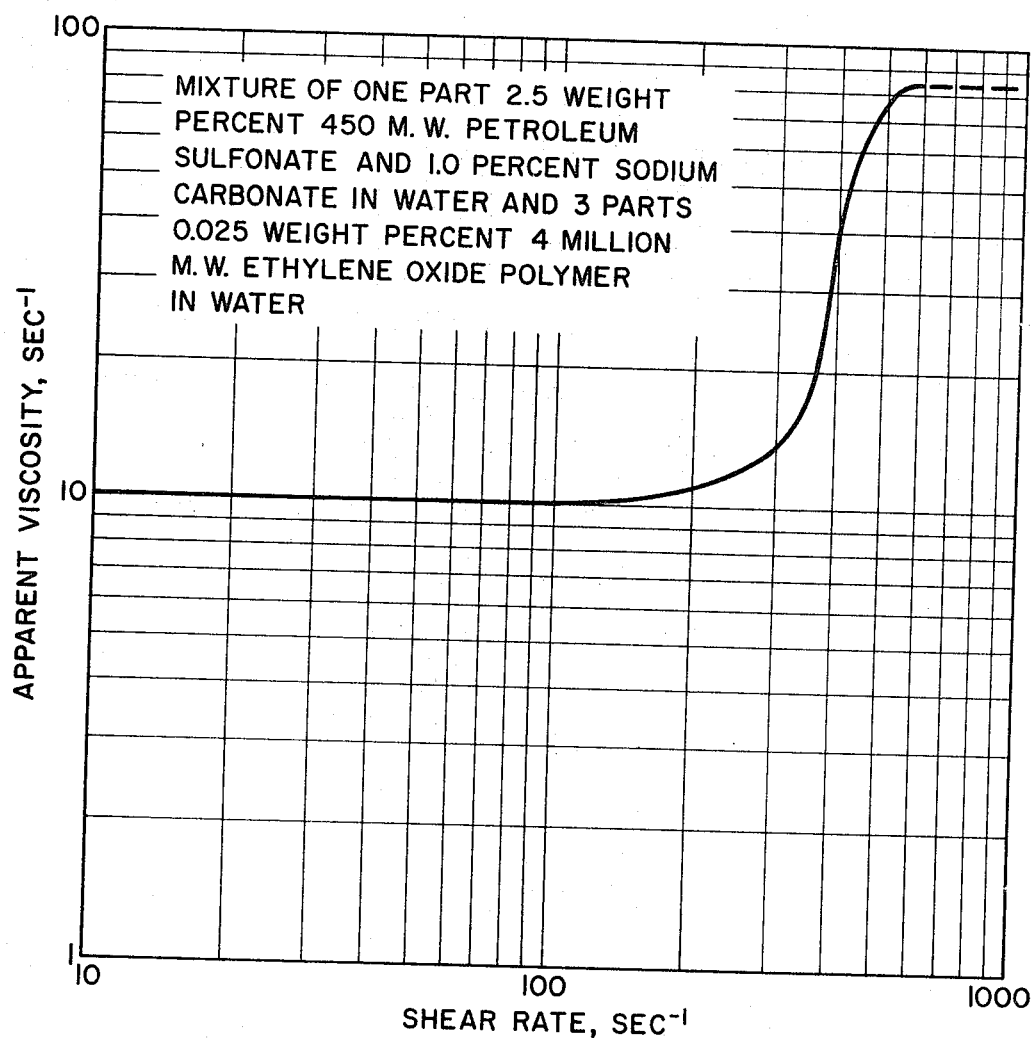
FIG. 4 is a log-log graph showing the variation of apparent viscosity with shear rate for a composition obtained by mixing the solutions illustrated in FIGS. 2 and 3 and illustrates the dilatant rheological characteristics of such a solution.

FIG. 4 illustrates the dilatant rheological characteristics that result from mixing the pseudoplastic aqueous solution of ethylene oxide polymer and the pseudoplastic aqueous solution of petroleum sulfonate. The solutions which were mixed had the same compositions as the solutions illustrated in FIGS. 2 and 3. Three parts of the aqueous solution of the ethylene oxide polymer and one part of the aqueous solution of the petroleum sulfonate were combined, and the apparent viscosity of the mixture was measured in the Fann Model 39 Rotational Viscometer. The results of these measurements are illustrated in FIG. 4. As the shear rate on the solution increases, the apparent viscosity increases radically. Between 100 and 500 reciprocal seconds, the apparent viscosity of the solution rises from 10 centipoises to more than 80 centipoises. Moreover, the absolute viscosity of the mixture at high shear rates is greatly in excess of that which would be predicted from its individual constituents. It can be noted with reference to FIG. 2 that at 500 reciprocal seconds, the apparent viscosity of the aqueous solution of polyethylene oxide would be approximately 4 centipoises. With reference to FIG. 3, it can be seen that the aqueous solution of the petroleum sulfonate has an apparent of approximately 2.5 centipoises at this shear rate. However, the viscosity of the mixture of these two components at 500 reciprocal seconds is in excess of 70 centipoises.

It should be noted that among the proposed uses for the compositions of this invention are recovering oil from subsurface reservoirs. In such an environment the compositions may be prepared from naturally occurring and available waters which may contain inorganic salts as dissolved solids. It should be noted that such inorganic salts do not affect the essential characteristics of the compositions of this invention. For example, the solution whose rheological characteristics are shown in FIG. 4, contained 0.25 percent by weight sodium carbonate plus inorganic salts associated with the petroleum sulfonates (approximately 0.05 weight percent sodium sulfate). Such salts in minor amounts do not affect the basic characteristics of this invention.

It should also be noted on FIG. 4 that above 500 reciprocal seconds the apparent viscosity-shear rate curve is extrapolated. Above this shear rate the viscometer was unable to accurately record the apparent viscosity of the solution. Due to the extreme viscosity of the solution at high shear rates it adhered to the revolving cylinder of the viscometer and showed an apparent but false decrease in viscosity as the shear rate further increased. The extrapolated data is consistent with that shown in FIG. 1 as determined on a capillary viscometer.

In preparing the compositions of this invention it is generally preferable to prepare separate solutions of the sulfonate and the polymer and then add the sulfonate solution slowly to the polymer solution with adequate stirring. Addition of the polymer solution to the sulfonate solution at times causes the formation of two phases that are difficult to recombine. However, where polymers at the lower end of the useful molecular weight range are employed, e.g., approximately 600,000 M.W., it has been found that the reverse order of mixing may be preferable to obtain a dilatant solution. Routine laboratory investigation will indicate the best manner of preparing a composition of any specific set of constituents.

For best results including maximum reproducibility, the polymer solution should be prepared without excessive agitation. Preferably the same shear rate should be used each time this solution is prepared.

In the hydraulic transport of dispersed solids through pipelines, the ultimate measure of economy is the "conveyance efficiency," i.e., the weight of solids delivered per unit of power expended. Studies have shown that economy is favored (a) by using the highest possible solids content, consistent with freedom of flow, (b) by using the lowest possible transport velocity without sedimentation, and (c) by selecting a vehicle fluid that flows with a minimum of hydraulic friction loss, consistent with an ability to suspend solids.

The compositions of the present invention are excellent vehicle fluids for the pipeline transmission of dispersed solids. Their dilatancy provides the necessary viscosity for suspending solids while the stream is flowing, but upon cessation of flow the viscosity drops, thereby facilitating a separation of the solids from the vehicle at a point of destination. The combination of dilatancy and viscoelasticity promotes laminar flow and plug flow, and reduces hydraulic friction losses.

As an example of the pipeline transmission of solids in accordance with the invention, a coal slurry of 60 percent by weight solids content may be pumped through a 10-inch diameter line, using an aqueous vehicle of the same composition illustrated in FIG. 1.

In the hydraulic fracturing of subsurface formations to stimulate the productivity or injectivity of wells, a fluid is forced into the well at a high pressure and flow rate, sufficient to overcome the natural compressive stresses of the earth, thereby creating a rupture or fracture in the exposed stratum or strata. Studies have shown that the width of the fracture depends on the apparent viscosity of the fracturing fluid as it enters and flows through the fracture. It is desirable to generate a wide fracture, and it is therefore desirable to fracture with a viscous fluid. However, in deep wells it is generally considered impossible to obtain a satisfactory fracturing operation with a highly viscous fluid, due to the sharp power losses incurred in the wellbore as a result of hydraulic friction. Moreover, it is generally feared that a highly viscous fracturing fluid would tend to plug the well, as a result of its low mobility in porous media.

Therefore, it is desirable to fracture with a fluid that has a variable viscosity, such that its greatest viscosity is experienced while forming the fracture, and such that it will flow with a reduced viscosity under conditions of low shear, as required to facilitate cleaning the well after a fracture is formed. The dilatant fluid of the present invention satisfies these requirements, and is therefore useful as a fracturing fluid.

The invention is further illustrated by the following example, wherein crude oil from a South Texas field was displaced from a Bartlesville Sandstone core by flooding the core with an aqueous solution containing 0.0125 percent by weight of an ethylene oxide polymer having a molecular weight of about 4,000,000 and 1.0 percent by weight of a mixture of sodium salts of hydrocarbon sulfonic acids, 400 M.W., obtained by sulfonating a blend of vacuum gas-oil cuts (boiling within the 800° to 1000° range) obtained from Texas Gulf Coast petroleum crudes. The flood was conducted at room temperature and atmospheric pressure, with a constant pressure gradient of 1.0 p.s.i.g. per linear foot of core, to simulate field conditions. The core was initially flooded with water to a residual oil saturation of about 40 percent of the pore volume. The displacement results are shown in the following table.

| Pore volumes thickened surfactant injected: | Percent of residual oil recovered |
|---|---|
| 1.0 | 48 |
| 2.0 | 73 |

The principle of the invention and the best mode in which it is contemplated to apply that principle have been described. It is to be understood that the foregoing is illustrative only and that other means and techniques can be employed without departing from the true scope of the invention defined in the following claims.

What is claimed is:

1. An aqueous composition of matter having non-Newtonian dilatant rheological characteristics and including as essential ingredients at least 0.001 weight percent of a polymer of ethylene oxide having a molecular weight of at least 600,000, at least 0.5 weight percent of a water dispersible petroleum sulfonate having an average molecular weight of at least 400, and a major proportion of water.

2. A composition as defined by claim 1 wherein the concentration of the polymer is between about 0.02 and about 1.5 weight percent.

3. A composition as defined by claim 1 wherein the concentration of the petroleum sulfonate is between about 0.5 weight percent to about 10 weight percent.

4. A composition as defined by claim 1 wherein the average molecular weight of the petroleum sulfonate is from about 400 to about 525.

5. A composition as defined by claim 1 including minor amounts of inorganic salts.

6. A pumpable slurry consisting of an aqueous substantial concentration of water insoluble particulate solids, and a fluid vehicle, wherein said vehicle has non-Newtonian dilatant rheological characteristics and includes as essential ingredients at least 0.001 weight percent of a polymer of ethylene oxide having a molecular weight of at least 600,000, at least 0.5 weight percent of a water-dispersible petroleum sulfonate having an average molecular weight of at least 400, and a major proportion of water.

7. A slurry as defined by claim 6 wherein said solids are selected from the group consisting of sulfur and bituminous substances.

8. A slurry as defined by claim 6 wherein said vehicle contains from about 0.02 weight percent to about 1.5 weight percent of the polymer of ethylene oxide.

9. A slurry as defined by claim 6 wherein said vehicle contains from about 0.5 weight percent to about 10 weight percent of a petroleum sulfonate.

10. A slurry as defined by claim 6 wherein the petroleum sulfonate has an average molecular weight of from about 400 to about 525.

References Cited
UNITED STATES PATENTS

| 2,610,900 | 9/1952 | Cross et al. | 302—66 |
| 2,965,172 | 12/1960 | Daroza | 166—308 |
| 3,254,719 | 6/1966 | Root | 252—8.55 X |
| 3,421,582 | 1/1969 | Fallgatter | 166—273 |
| 3,361,313 | 1/1968 | Riggs et al. | 252—8.55 |

FOREIGN PATENTS

| 668,844 | 8/1963 | Canada. |

HERBERT B. GUYNN, Primary Examiner

U.S. Cl. X.R.

166—274, 275, 308; 252—8.55 R, 8.55 D, 313 R; 302—66

UNITED STATES PATENT OFFICE
CERTIFICATE OF CORRECTION

Patent No. 3,663,477     Dated May 16, 1972

Inventor(s) G. P. Ahearn

It is certified that error appears in the above-identified patent and that said Letters Patent are hereby corrected as shown below:

Column 8, Line 9, following "of" delete "an aqueous" and insert --a--.
Column 8, Line 11, following "and" delete "a" and insert --an aqueous--.

Signed and sealed this 5th day of December 1972.

(SEAL)
Attest:

EDWARD M. FLETCHER, JR.
Attesting Officer

ROBERT GOTTSCHALK
Commissioner of Patents